United States Patent
Le et al.

(10) Patent No.: US 12,500,776 B1
(45) Date of Patent: Dec. 16, 2025

(54) MULTI-CONTEXT SENSOR SECURITY

(71) Applicant: QUALCOMM Incorporated, San Diego, CA (US)

(72) Inventors: Khoi Le, San Diego, CA (US); Rohan Desai, San Diego, CA (US); Nithyashankari Gummidipoondi Jayasankaran, Chennai (IN); Nagashree Ganapati Upadhya, Bangalore (IN); Ankitkumar Parshotambhai Savaliya, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 18/745,936

(22) Filed: Jun. 17, 2024

(51) Int. Cl.
| | |
|---|---|
| *H04L 9/32* | (2006.01) |
| *B60C 23/04* | (2006.01) |
| *G06F 12/14* | (2006.01) |
| *G06F 21/60* | (2013.01) |
| *G06F 21/78* | (2013.01) |
| *H04L 9/06* | (2006.01) |

(Continued)

(52) U.S. Cl.
CPC ........ *H04L 9/3242* (2013.01); *B60C 23/0455* (2013.01); *G06F 12/1408* (2013.01); *G06F 12/145* (2013.01); *G06F 21/602* (2013.01); *G06F 21/78* (2013.01); *H04L 9/0643* (2013.01); *H04L 9/3239* (2013.01); *H04W 12/0471* (2021.01); *H04W 12/06* (2013.01); *H04W 12/106* (2021.01)

(58) Field of Classification Search
None
See application file for complete search history.

(56) References Cited

U.S. PATENT DOCUMENTS 8,045,693 B2 * 10/2011 Yao .................... H04L 12/1868
 379/220.01
8,949,600 B2 * 2/2015 Paddon ................ H04L 63/123
 713/168

(Continued)

FOREIGN PATENT DOCUMENTS

| CN | 109388975 A | * | 2/2019 | ........... H04L 9/3242 |
| CN | 109582485 A | * | 4/2019 | .......... G06F 11/0706 |

(Continued)

OTHER PUBLICATIONS

Bart Preneel, and Paul C. van Oorschot; (On the Security of Iterated Message Authentication Codes); pp. 12; IEEE Transactions on Information Theory, vol. 45, No. 1, Jan. (Year: 1999).*

(Continued)

*Primary Examiner* — Ali H. Cheema
(74) *Attorney, Agent, or Firm* — Polsinelli (57) ABSTRACT

Systems and techniques are provided for authenticating sensor data. For instance, a computing device can obtain a first line of data from a first sensor. The computing device can retrieve, from at least one memory, an intermediate hash associated with the first sensor. The computing device can determine a current intermediate hash based on sensor data in the first line of data. The computing device can store the current intermediate hash in the at least one memory for processing a second line of data associated with the first sensor.

20 Claims, 7 Drawing Sheets

(51) Int. Cl.
  *H04W 12/0471* (2021.01)
  *H04W 12/06* (2021.01)
  *H04W 12/106* (2021.01)

(56) References Cited

U.S. PATENT DOCUMENTS

| | | | | |
|---|---|---|---|---|
| 11,865,538 | B2* | 1/2024 | Yao | G01N 33/48707 |
| 12,285,979 | B2* | 4/2025 | Schubert | B60C 23/0455 |
| 2007/0079362 | A1* | 4/2007 | Lortz | H04L 63/162 |
| | | | | 726/5 |
| 2008/0244739 | A1* | 10/2008 | Liu | H04L 63/1466 |
| | | | | 726/22 |
| 2010/0135484 | A1* | 6/2010 | Nishikawa | H04L 9/3239 |
| | | | | 380/28 |
| 2012/0081519 | A1* | 4/2012 | Goma | H04N 13/239 |
| | | | | 348/47 |
| 2018/0191716 | A1* | 7/2018 | Chhabra | G06F 21/78 |
| 2019/0042476 | A1* | 2/2019 | Chhabra | G06F 21/85 |
| 2020/0250101 | A1* | 8/2020 | Patsilaras | H03M 7/30 |
| 2022/0075738 | A1* | 3/2022 | Ghosh | H04L 9/3239 |
| 2022/0222143 | A1* | 7/2022 | Chhabra | G06F 21/60 |
| 2025/0119280 | A1* | 4/2025 | Stapleton | H04L 9/14 |

FOREIGN PATENT DOCUMENTS

| | | | | |
|---|---|---|---|---|
| CN | 112134702 | A * | 12/2020 | H04L 67/12 |
| CN | 112667429 | A * | 4/2021 | |
| CN | 114238453 | A * | 3/2022 | G06F 16/24568 |
| CN | 116467379 | A * | 7/2023 | G06F 16/25 |
| JP | 2024070448 | A * | 5/2024 | H04L 9/3242 |

OTHER PUBLICATIONS

S. M. Suhail Hussain, Shaik Mullapathi Farooq, and Taha Selim Ustun; (Analysis and Implementation of Message Authentication Code (MAC) Algorithms for GOOSE Message Security); pp. 5; IEEE, date of publication Jun. 19, 2019, date of current version Jul. 3, (Year: 2019).*

* cited by examiner

MULTI-CONTEXT SENSOR SECURITY

FIELD

The present application is related to information security. For example, aspects of the present application relate to systems and techniques multi-context sensor security for securing sensor data.

BACKGROUND

Increasingly, systems and devices (e.g., autonomous vehicles, such as autonomous and semi-autonomous cars, drones, mobile robots, mobile devices, extended reality (XR) devices, and other suitable systems or devices) include multiple sensors to gather information about the environment, as well as processing systems to process the information gathered, such as for route planning, navigation, collision avoidance, environment modelling/rendering, etc. As an example, a vehicle may include one or more camera sensors, lidar sensor(s), radar sensor(s), etc., and an XR device may include multiple camera sensors, lidar sensor(s), radar sensor(s), sonar sensor(s), etc. These sensors can generate a substantial amount of sensor data that should be quickly processed so that the sensor data can be made useful. Additionally, sensor data from the sensors may be integrity protected, encrypted, or otherwise secured to avoid potential attacks, such as man-in-the-middle attacks. This secured sensor data may then be checked for security prior to processing the contents of the sensor data.

SUMMARY

Systems and techniques are described herein for securing sensor data. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, apparatuses, methods and computer-readable media for securing sensor data are provided. In one illustrative example, an apparatus for authenticating sensor data is provided. The apparatus includes at least one memory and at least one processor coupled to the at least one memory. The at least one processor is configured to: obtain a first line of data from a first sensor; retrieve, from the at least one memory, an intermediate hash associated with the first sensor; determine a current intermediate hash based on sensor data in the first line of data; and store the current intermediate hash in the at least one memory for processing a second line of data associated with the first sensor.

As another example, a method for authenticating sensor data is provided. The method includes: obtaining a first line of data from a first sensor; retrieving, from at least one memory, an intermediate hash associated with the first sensor; determining a current intermediate hash based on sensor data in the first line of data; and storing the current intermediate hash in the at least one memory for processing a second line of data associated with the first sensor.

In another example, a non-transitory computer-readable medium having stored thereon instructions is provided. The instructions, when executed by at least one processor, cause the at least one processor to: obtain a first line of data from a first sensor; retrieve, from at least one memory, a partial message authentication code (MAC) associated with the first sensor; determine a current intermediate hash based on sensor data in the first line of data; and store the current intermediate hash in the at least one memory for processing a second line of data associated with the first sensor.

As another example, an apparatus for authenticating sensor data is provided. The apparatus includes: means for obtaining a first line of data from a first sensor; means for retrieving, from at least one memory, an intermediate hash associated with the first sensor; means for determining a current intermediate hash based on sensor data in the first line of data; and means for storing the current intermediate hash in the at least one memory for processing a second line of data associated with the first sensor.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit data or information over a transmission medium to at least one device. In some aspects, the processor includes a central processing unit (CPU), a graphics processing unit (GPU), a neural processing unit (NPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

As devices become more complex and capable of more complex tasks, devices are increasingly being equipped with multiple sensors to perceive the world around them. As an example, an automated vehicle or XR device may have a suite of sensors, such as multiple camera sensors, lidar sensor(s), radar sensor(s), sonar sensor(s), etc. In some cases, such as for automated vehicles, the sensors may be mounted remotely from a system, such as a processor, which may process data generated by the sensor. Additionally, as the sensor may be mounted remotely, the sensor may be more easily tampered with. Therefore, techniques to integrity protected, encrypted, or otherwise secure sensor data to ensure that the sensor and/or sensor data has not been tampered with may be useful.

Systems, apparatuses, electronic devices, methods (also referred to as processes), and computer-readable media (collectively referred to herein as "systems and techniques") are described herein for multi-context sensor security. For example, the systems and techniques can receive lines of data from one or more sensors. A line of data (e.g., packet of data) may be any amount of sensor data, such as image data for a row of pixels. In some cases, the sensor data may be image data, and an image may be sent from the image sensor as a set of lines representing the image. Based on the sensor the line of data was received from, an intermediate hash may be retrieved from a memory, such as a lookup table. In some cases, a message authentication code (MAC) may be calculated over the sensor data incrementally using intermediate hashes that may be determined on a line by line basis. For example, the intermediate hash may have been determined based on one or more previous lines associated with a first sensor. A current MAC may then be determined based on the intermediate hash and the sensor data in a first line of data. The intermediate hash may then be stored in the memory. In some cases, another line of data from another sensor may be processed after the first line of data. For example, sensor data from multiple sensors may be interleaved. The sensor data from the multiple sensors may be identified based on virtual channel information and each sensor may have a separate virtual channel (e.g., different virtual channel information). A second line of data from the first sensor may be obtained and the second line of data may include a MAC value (e.g., calculated by the sensor). The sensor data in the second line of data, up to the MAC value, may be used, along with the current MAC to determine a calculated MAC. This calculated MAC may then be compared to the MAC value to authenticate the set of lines.

Various aspects of the application will be described with respect to the figures.

Figure 1:
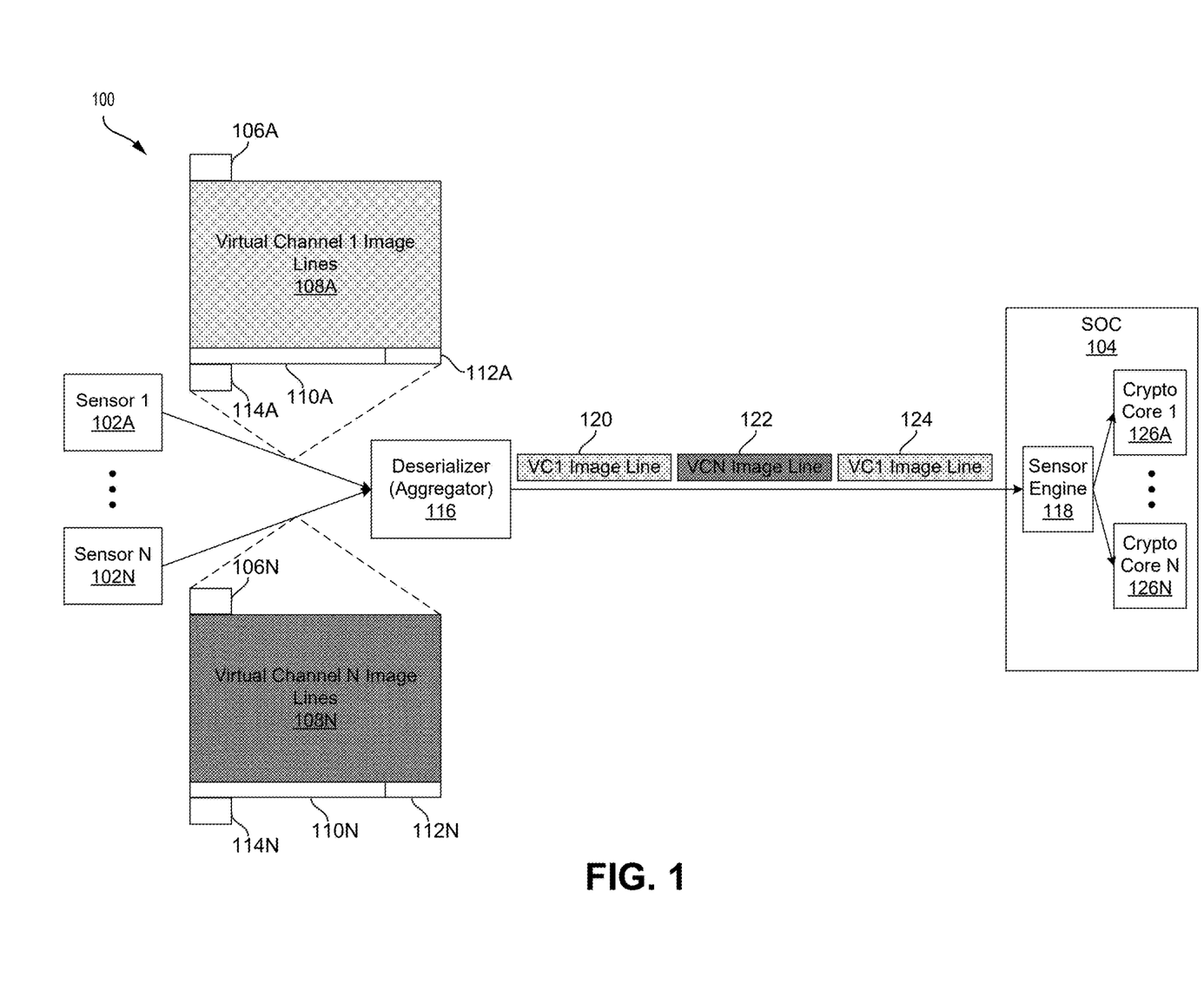
FIG. 1 is a block diagram illustrating an architecture of a sensor system with sensor security, in accordance with aspects of the present disclosure.

FIG. 1 is a block diagram illustrating an architecture of a sensor system 100 with sensor security, in accordance with aspects of the present disclosure. The sensor system 100 includes multiple components for securely streaming sensor data from a set of sensors (e.g., sensor 1 102A, . . . sensor N 102N, collectively, sensors 102) to a processor to process the sensor data. In some cases, the processor may be integrated into a single integrated circuit or chip (e.g., referred to as a system-on-chip or SOC 104). In some cases, the sensors 102 may support sensor data security to allow the sensors 102 to securely send sensor data to the SOC 104. For example, the sensors 102 may encrypt, integrity protect, or otherwise secure the sensor data output by the sensors 102 and the SOC 104 may verify the integrity and/or authenticity of the sensor data to avoid certain potential attacks, such as man-in-the-middle attacks.

As an example of sensor data security, the sensors 102 may support a cipher-based message authentication code (CMAC), such as NIST SP800-38B. As an example, a sensor, such as sensor 1 102A, may capture an image (e.g., frame). The image captured by sensor 1 102A may be encoded into a GMAC frame structure that includes a frame start packet 106A, a set of image lines 108A, embedded metadata 110A, a message authentication code (MAC) 112A, and a frame end packet 114A. The frame start packet 106A may indicate a start of an encoded image (e.g., frame). In some cases, the frame start packet 106A may also encode a virtual channel associated with the sensor 1 102A. The virtual channel indicates which sensor an encoded image was captured by and can be used to identify the sensor used to capture the image. The set of image lines 108A may include the image data (or other sensor data) captured by sensor 1 102A. In some cases, the image data may be divided into lines (e.g., packets, long packets). For example, the sensor 1 102A may package a first row of image data (e.g., pixel data) into a first line (e.g., packet) and output (e.g., stream) the first line to a deserializer (e.g., aggregator) 116. The sensor 1 102A may package a second row of image data into a second line and output the second line to the deserializer 116, and so forth. Of note, while discussed in context with a row of image data, it should be understood that a line (e.g., long packet) may include any amount of sensor data, such as image data for a row of pixels, two rows of pixels, half a row of pixels, a block of pixels, etc.

In some cases, each line (e.g., long packet) may include a packet header and packet footer (not shown) along with the payload (e.g., sensor data). The packet header for a line may include information about the sensor data such as the virtual channel, a data type of the sensor data, and/or a word count (e.g., length of the sensor data). The packet footer may include a checksum of the image data (e.g., payload). In some cases, the set of image lines 108A may also include embedded data, such as a frame header, frame footer, etc. The embedded metadata 110A may include GMAC or CMAC frame metadata such as a tag mode indicating how the MAC 112A is computed. The MAC 112A may be a code that may be determined based on the contents of the set of image lines 108A along with a block cipher and secret key. In some cases, the secret key may be shared between the sensors 102 and the SOC 104, for example, in a registration (e.g., initialization, configuration, etc.) procedure. In some cases, the MAC 112A may be determined for image (e.g., set of image lines 108A, as opposed to being determined for each line) and the MAC 112A may be determined in a way that supports inline calculation when GMAC frame is received line by line (as indicated by the embedded metadata 110A).

In this example, another sensor, sensor N 102N may also capture images and transmit GMAC frames that includes a frame start packet 106N a set of image lines 108N, embedded metadata 110N, a message authentication code (MAC) 112N, and a frame end packet 114N. In some cases, the sensors 102 may output sensor data in real time. Sensor N 102N may also output lines to the deserializer 116. Of note, while two sensors 102 are shown, any number of sensors 102 may be used.

The deserializer 116 may receive lines from multiple sensors 102 and the deserializer 116 may separate the lines received from a sensor (e.g., sensor 1 102A) to interleave (e.g., time division multiplex) the lines received from the multiple sensors 102 (e.g., from sensor N 102N, or another sensor). The deserializer 116 may transmit the interleaved lines to a sensor engine 118 of the SOC 104. For example, the deserializer 116 may transmit, at a first time, a first line 120 of the set of image lines 108A associated with sensor 1 102A, followed, at a second time, a first line 122 of the set of image lines 108N associated with sensor N 102N, followed, at a third time, by a second line 124 of the set of image lines 108A associated with sensor 1 102A, and so forth. In some cases, the deserializer 116 may transmit the interleaved lines over a single serial connection to the sensor engine 118 and the serial connection to the sensor engine 118 may have a higher bandwidth as compared to connections to the individual sensors 102.

The sensor engine 118 may deinterleave the interleaved lines to separate the lines based on the virtual channel (e.g., sensor) associated with the lines. In some cases, the sensor engine 118 may separate the lines based on information in the headers of the lines. To process the secured sensor data in real time (e.g., inline processing), the sensor engine 118 may pass the separated lines to a set of crypto cores 126A, . . . , 126N (collectively, crypto cores 126). The crypto cores 126 may verify the security and/or authentication of the GMAC frame. For example, the crypto cores 126 may verify the security and authentication of a frame from sensor 1 102A by accumulating the lines as then arrive and calculating a MAC based on the set of image lines 108A and comparing the calculated MAC to the MAC 112A of the GMAC frame after the MAC 112A is received. If the calculated MAC is equal to the MAC 112A of the GMAC frame, then the frame may be verified as secure and as an authentic frame from sensor 1 102A. In some cases, to process the sensor data from a single sensor (e.g., sensor 1 102A), a separate crypto core (e.g., crypto core 1 126A) may be used. Thus, there may be an equal number of crypto cores 126 as there are sensors 102 (e.g., virtual channels, sensor data streams, sensors which support secure data streams, etc.). In some cases, scaling a number of crypto cores 126 based on a number of sensors 102 can be relatively expensive in terms of silicon area, power, etc. In some cases, it may be more cost effective to use a single crypto core that supports multiple contexts (e.g., virtual channels, sensor data streams, etc.).

Figure 2:
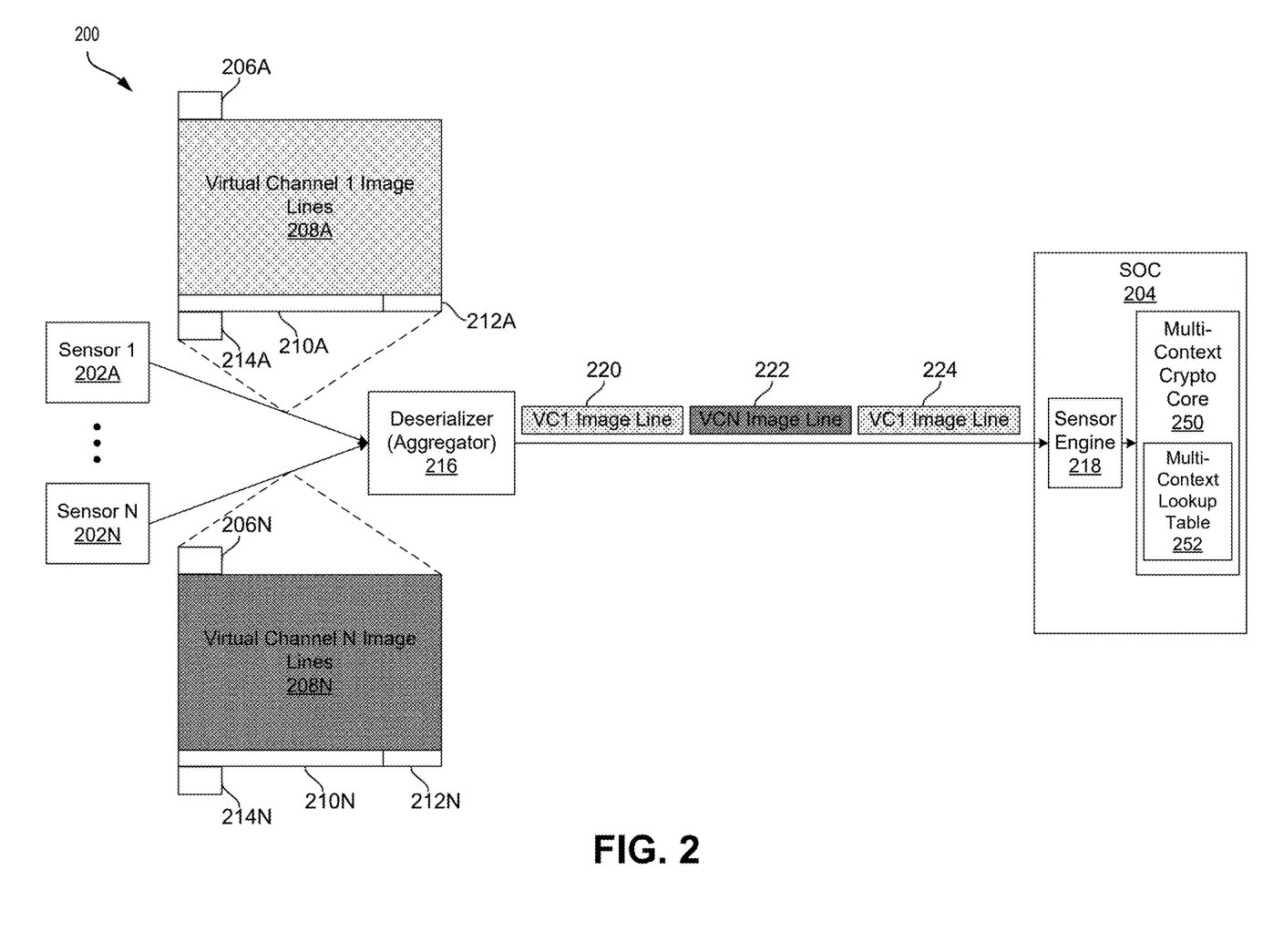
FIG. 2 is a block diagram illustrating an architecture of a sensor system with sensor security through a multi-context crypto core, in accordance with aspects of the present disclosure.

FIG. 2 is a block diagram illustrating an architecture of a sensor system 200 with sensor security through a multi-context crypto core 250, in accordance with aspects of the present disclosure. The sensor system 200 may be similar to sensor system 100 and include components for securely stream sensor data from a set of sensors (e.g., sensor 1 202A, . . . sensor N 202N, collectively, sensors 202) to a processor to process the sensor data. The sensors 202 may be substantially similar to sensors 102 of FIG. 1 and the sensors 202 may support a cipher-based message authentication code (CMAC), such as NIST SP800-38B. The GMAC frame structure may include a frame start packet 206A, . . . , 206N, a set of image lines 208A, . . . , 208N, embedded data 210A, . . . , 210N, a message authentication code (MAC) 212A, . . . , 212N, and a frame end packet 214A, . . . , 212N.

The sensors 202 may output sensor data to a deserializer 216 and the deserializer 216 may receive lines from multiple sensors 202. The deserializer 216 may be substantially similar to deserializer 116 of FIG. 1 and the deserializer 216 may separate the lines received from a sensor (e.g., sensor 1 202A) to interleave (e.g., time division multiplex) the lines received from the multiple sensors 202 (e.g., from sensor N 202N, or another sensor). The deserializer 216 may transmit the interleaved lines (e.g., lines 220, 222, and 224) to a sensor engine 218 of a SOC 204. The sensor engine 218 may be substantially similar to sensor engine 118 of FIG. 1, and the sensor engine 218 may deinterleave the interleaved lines to separate the lines based on the virtual channel (e.g., sensor) associated with the lines. The sensor engine 218 may pass the lines to the multi-context crypto core 250. The multi-context crypto core 250 may be configured to switch processing for the lines from multiple sensors 202. For example, the multi-context crypto core 250 may be configured to switch operating contexts each time a new line is received (e.g., based on the headers and footers of each line) from the sensor engine 218.

In some cases, the multi-context crypto core 250 may include a multi-context lookup table 252 to help verify the security and/or authentication of the GMAC frames in real time (e.g., to avoid having to buffer/save sensor data for a full GMAC frame before processing the MAC). In some cases, the multi-context crypto core 250 may partially calculate the MAC for each line as each line is received to generate a full calculated MAC for the frame that may be compared to the MAC included with a frame (e.g., MAC 212A, . . . , 212N). As lines from multiple sensors may be interleaved, the multi-context crypto core 250 may determine a intermediate hash for a particular line from sensor 1 202A being received/processed and then save that intermediate hash in a memory, such as the multi-context lookup table 252, before processing a next line from sensor N 202N. In some cases, the multi-context crypto core 250 may hold intermediate hashes as well as other parameters, such as frame information (e.g., line counter, tag mode, etc.), etc. that may be used to process a frame. In some cases, the data stored in the multi-context lookup table 252 may be stored based on the virtual channel associated with the sensor data (e.g., from the header of the line) being received. Before processing the next line from sensor N 202N, the multi-context crypto core 250 may load the intermediate hash and other parameters (if available) for the next line (e.g., based on the virtual channel).

Figure 3:
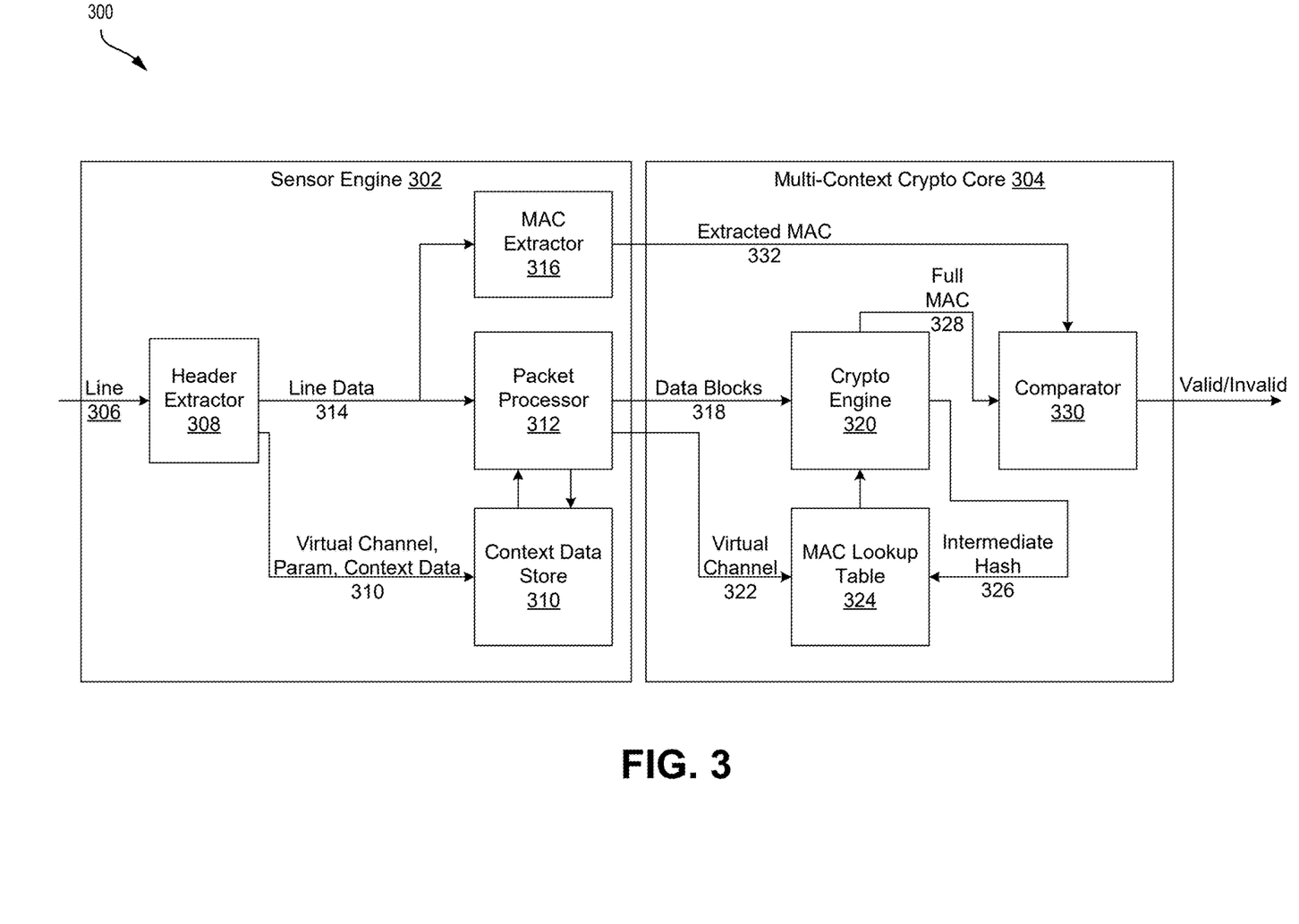
FIG. 3 is a block diagram illustrating components for multi-context sensor security 300, in accordance with aspects of the present disclosure.

FIG. 3 is a block diagram illustrating components for multi-context sensor security 300, in accordance with aspects of the present disclosure. FIG. 3 includes a sensor engine 302 and a multi-context crypto core 304. The sensor engine 302 may be substantially similar to sensor engine 218 of FIG. 2 and the multi-context crypto core 304 may be substantially similar to multi-context crypto core 250 of FIG. 2. In some cases, multiplexed lines 306 from multiple sensors may be received, for example from the deserializer 216 of FIG. 2 by a header extractor 308 of the sensor engine 302. The header extractor 308 may extract embedded data (e.g., frame header, frame footer, embedded metadata (e.g., embedded metadata 110 of FIG. 1, embedded metadata 210 of FIG. 2, etc.), word count, data type, line header, etc. to obtain the virtual channel information along with other parameters, such as frame information for processing a frame (e.g., a line of a frame) from a line being received, for example, from sensor 1 202A. The header extractor 308 may transmit the extracted embedded data to a context data store 310. The context data store 310 may be a memory, such as a lookup table, and the context data store 310 store the extracted embedded data for use by a packet processor 312. The extracted embedded data associated with a line of a frame (e.g., as extracted from an earlier line/frame header) may be loaded for use in processing line data (e.g., sensor data in a line). For example, a first line for a frame from a first sensor (e.g., sensor 1 202A) may include embedded data that may be extracted and stored to the context data store 310 by the header extractor 308. This extracted embedded data may include a virtual channel identifier for the first sensor along with other parameters/context data that may be used to process the frame/line.

The header extractor 308 may also transmit line data 314 to the packet processor 312 and a MAC extractor 316. In some cases, the line data 314 may be the contents of the received line 306. The MAC extractor 316 may check the line data 314 for a MAC field (e.g., MAC 112 of FIG. 1, MAC 212 of FIG. 2, etc.) and may extract the MAC value from the frame when the line 306 includes the MAC field. The packet processor 312 may load embedded data, parameters, etc. associated with a line from the context data store 310, for example, based on the virtual channel in a line header. Returning to the previous example, after processing a second line from a different sensor (e.g., sensors N 202N), the packet processor 312 may receive a third line associated with the first sensor. The packet processor 312 may obtain, for example, a line header including a virtual channel identifier. The packet processor 312 may match the virtual channel identifier to stored virtual channel identifiers in the context data store 310 and load the associated embedded data to process the third line to generate data blocks 318. In some cases, the virtual channel identifier may also be provided by the header extractor 308 to packet processor 312 and/or context data store 310 to obtain the embedded data. The data blocks 318 may be sensor data included in the third line (e.g., line 306) and the data blocks 318 may be output to a crypto engine 320 of the multi-context crypto core 304. The packet processor 312 (or header extractor 308) may also output the virtual channel information 322 (e.g., an identifier value for a virtual channel) to a MAC lookup table 324 of the multi-context crypto core 304.

The crypto engine 320 may calculate a partial or calculated (e.g., final, full, etc.) MAC based on the data blocks, and previous intermediate hash from the MAC lookup table 324 (if available). For example, based on the virtual channel information 322, the MAC lookup table 324 may provide the crypto engine 320 with a previous intermediate hash based on the virtual channel information 322. The crypto engine 320 may use the previous intermediate hash and determine a current intermediate hash 326 based on the data blocks 318, if a MAC (or other indication that the crypto engine 320 may determine a calculated MAC) is not included in the line 306. The current intermediate hash 326 may then be output by the crypto engine 320 to the MAC lookup table 324 for storage as a next previous intermediate hash for processing a next line.

If a MAC is included in the line 306, the crypto engine 320 may determine a calculated MAC 328 value using the previous intermediate hash from the MAC lookup table 324 and the data blocks 318. The calculated MAC 328 value may be output to a comparator 330. Returning to the MAC extractor 316, if the MAC extractor 316 identifies a MAC field in the line data, the MAC extractor 316 may extract the MAC value from the MAC field and output the extracted MAC value 332 to the comparator 330. The extracted MAC value 332 may be compared to the calculated MAC 328 value by the comparator 330. If the extracted MAC value 332 is equal to the calculated MAC 328 value, then the line 306 and the rest of the frame associated with the line 306 may be determined as authenticated and/or validated. If the extracted MAC value 332 is not equal to the calculated MAC 328 value, then the line 306 and the rest of the frame associated with the line 306 may be determined to be invalid.

In some cases, the multi-context crypto core 304 may be integrated with the sensor engine 302. In some cases, the MAC lookup table 324 and context data store 310 may be integrated into a single memory (e.g., a single lookup table), such as shown as the multi-context lookup table 252 of FIG. 2.

Figure 4:
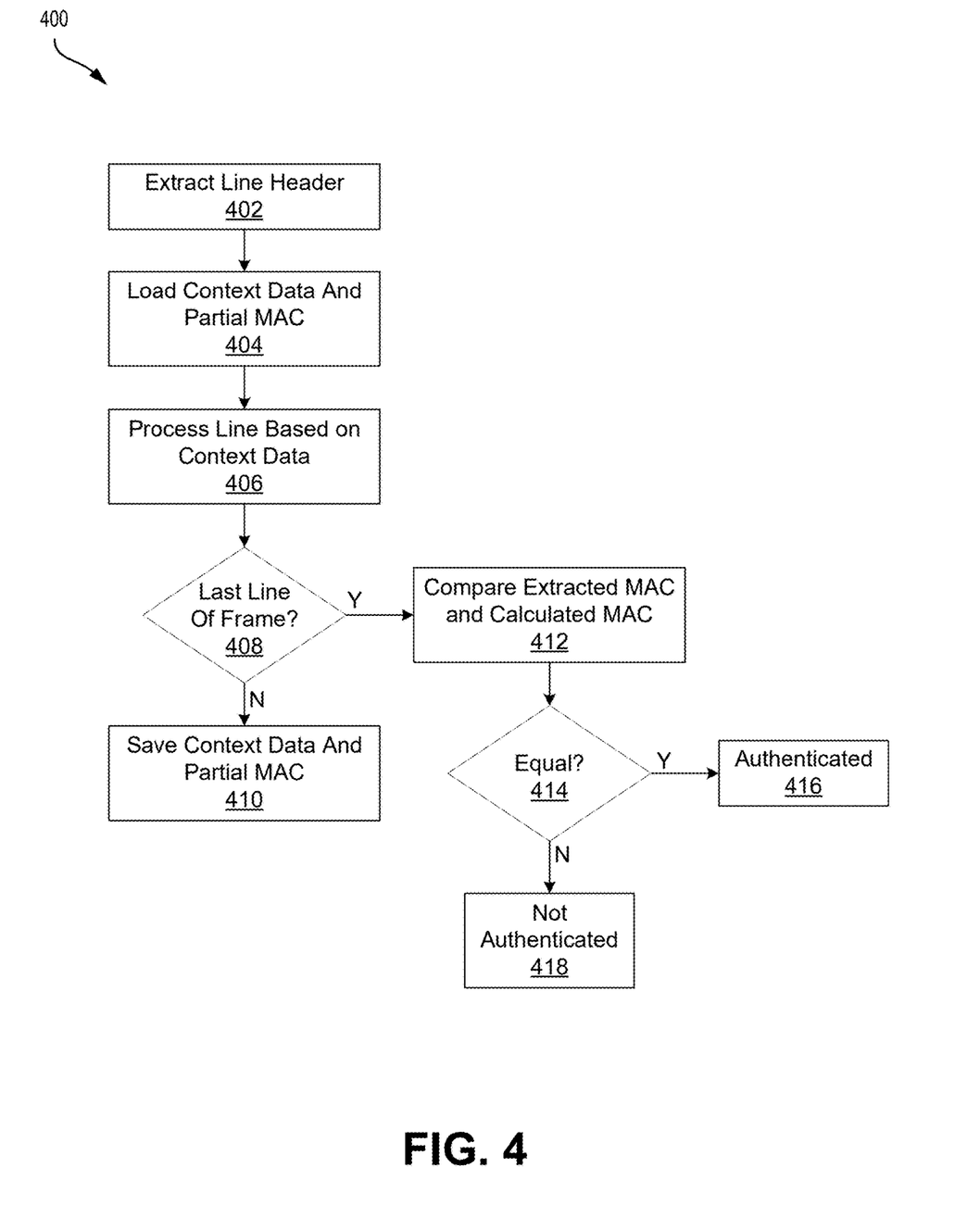
FIG. 4 is a logical flow diagram illustrating a multi-context sensor security, in accordance with aspects of the present disclosure.

FIG. 4 is a logical flow diagram illustrating a multi-context sensor security 400, in accordance with aspects of the present disclosure. After a line is received, at block 402, headers of the line (e.g., line headers) may be extracted. The line headers may include virtual channel information indicating the virtual channel (and hence sensor) the line is associated with. At block 404, context data and a intermediate hash may be loaded. In some cases, the virtual channel information may be used to retrieve a intermediate hash along with parameters and/or context data that may be used to process the line. For example, a intermediate hash may have been determined for a previous line and this intermediate hash may be loaded based on the virtual channel information. As another example, a word count (or line count) field may be loaded and updated based on the virtual channel information. As yet another example, an initialization vector may be generated and/or used if certain parameters about the line are set and these parameters may be retrieved (e.g., loaded) based on the virtual channel information.

At block 406, the line may be processed based on the context data. For example, the line data may be used along with the intermediate hash to compute a new intermediate hash (e.g., update the intermediate hash). At block 408, if the line is not the last line of a frame (e.g., if the line does not include a MAC), then, at block 410, the context data and new intermediate hash may be saved (e.g., in one or more lookup tables). If, at block 408, the line is the last line of a frame (e.g., the line includes a MAC), then, at block 412, a calculated MAC may be determined based on the intermediate hash and the calculated MAC may be compared against an extracted MAC from the line. If, at block 414, the calculated MAC is determined to be equal to the extracted MAC, then at block 416, the frame may be determined to be authenticated. If, at block 414, the calculated MAC is determined to be not equal to the extracted MAC, then at block 418, the frame may be determined as being not authenticated. In some cases, if the frame is determined as being not authenticated, then a MAC mismatch error or flag may be set (e.g., raised, sent, thrown, etc.).

Figure 5:
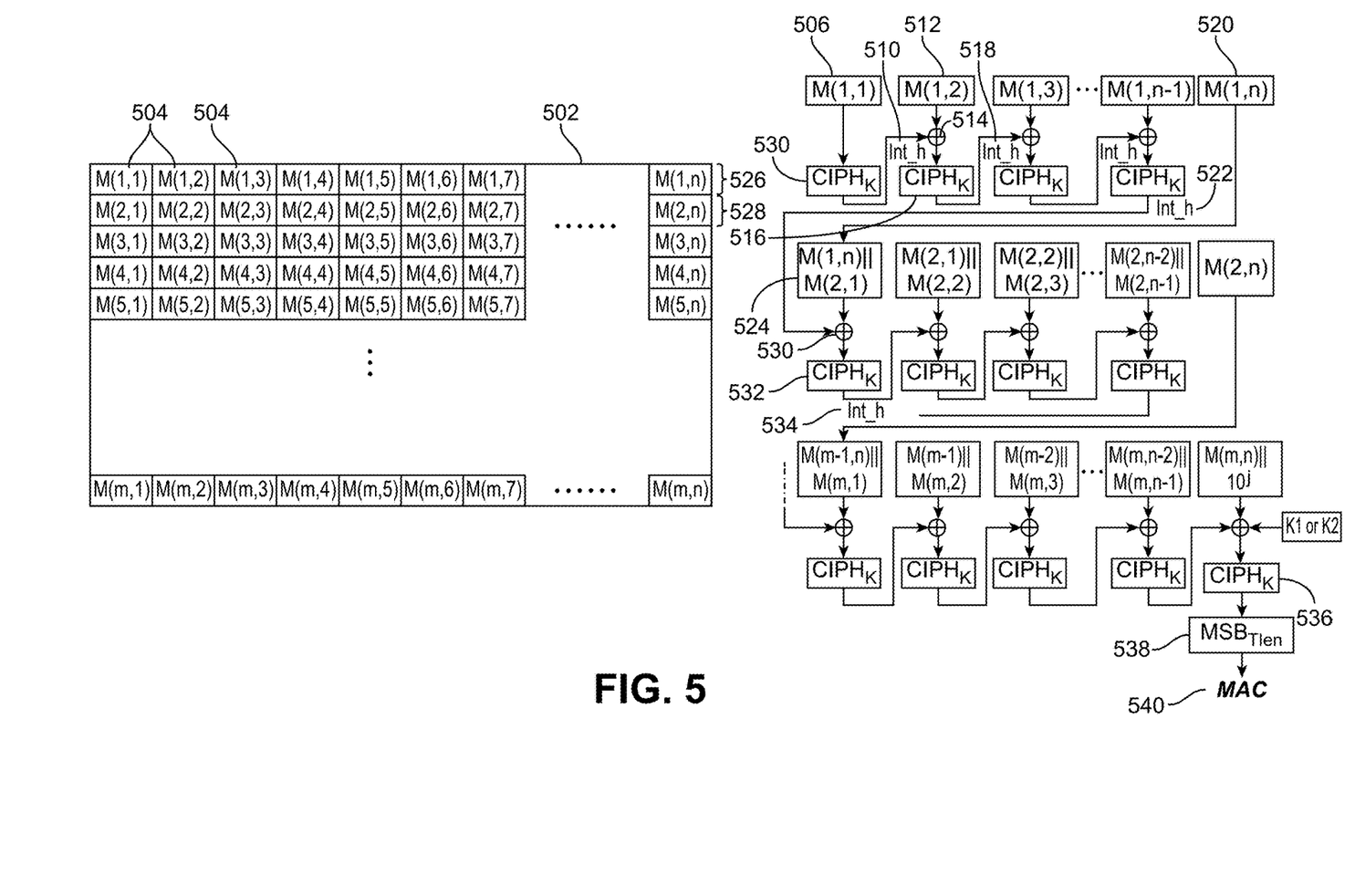
FIG. 5 illustrates an example technique for determining a MAC with multi-context support, in accordance with aspects of the present disclosure.

FIG. 5 illustrates an example technique for determining a MAC with multi-context support 500, in accordance with aspects of the present disclosure. In some cases, a MAC may be incrementally determined based on a set of data, such as pixel data in a captured frame (e.g., image). As shown in FIG. 5, a frame 502 may be divided into a set of blocks 504 which comprise a message M. In some cases, the set of blocks 504 may include pixel data along with metadata, embedded data, etc. The frame 502 (along with metadata, embedded data, etc.) may be divided into blocks (M(1, 1), . . . M(m,n)) of a predetermined size, such as 128 bits.

As a part of determining the MAC, data from a first block 506 (M(1, 1)) of a first line 526 may be input to a ciphering algorithm 508 along with a secret key K (e.g., shared between the sensor and a processor (e.g., of an SOC) coupled to the sensor) to generate a first intermediate hash 510. Data from a second block 512 (M(1, 2)) of the first line 526 may be added 514 to the first intermediate hash 510 and input to the ciphering algorithm 516 along with the secret key K to generate a second intermediate hash 518. This process repeats until a last block 520 (M(1, n)) of the first line 526 is reached. In some cases, the last block 520 (M(1, n)) of the first line 526 may be a different size as compared the other blocks of the line, such as the first block 506 or second block 512. For example, the last block 520 (e.g., partial block) may be smaller in size (e.g., a few number of bytes smaller) as compared to the other block of the line. The data from the last block 520, along with a previous intermediate hash 522 (e.g., intermediate hash from the block before the last block 520 of the line) may be saved to a memory, such as the MAC lookup table 324 of FIG. 3. The data from the last block 520 and previous intermediate hash may make up the intermediate hash.

When data from a second line 528 is received, the data from the last block 520 may be retrieved along with the previous intermediate hash 522. As the data from last block 520 is smaller than the predetermined size, some data (e.g., a few number of bytes) may be used from a next block (e.g., block M(2, 1)) of the second line 528 to form a complete block of the predetermined size (e.g., 128 bits), here a third block 524. The data from the next block may be concatenated to the data from the last block 520 to form the third block 524. Data from the third block (e.g., a concatenated block) may be summed 530 with the retrieved previous intermediate hash 522 and input to the ciphering algorithm 532 along with the secret key K to generate another intermediate hash 534. This borrowing of data for the last block 520 makes the next block (e.g., block M(2, 1)) become a partial block, and this has a cascading effect to all subsequent blocks all the way to the last block (M(m, n)) of the frame. In some cases, the last block (M (m, n)) may be padded as needed to reach the predetermined size. At the end of each line, the data from the last partial block and intermediate hash generated from a previous block of the line may be saved for use with a next line. At the end of the frame (e.g., the last block of the frame), the most significant bits of the output of the ciphering algorithm 536 may be extracted 538 as the calculated MAC 540.

Figure 6:
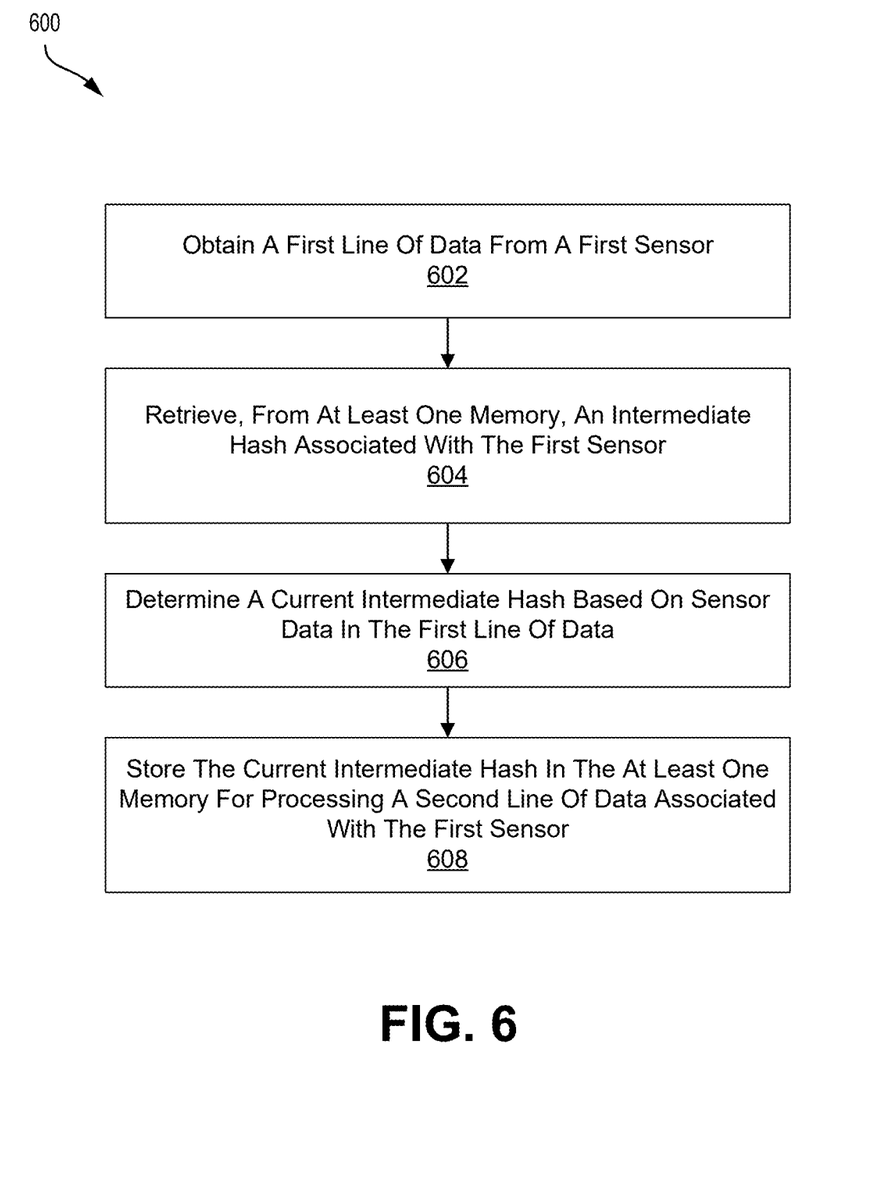
FIG. 6 is a flow diagram illustrating a process for authenticating sensor data, in accordance with aspects of the present disclosure.

FIG. 6 is a flow diagram illustrating a process 600 for authenticating sensor data, in accordance with aspects of the present disclosure. The process 600 may be performed by a computing device (or apparatus) or a component (e.g., a chipset, codec, etc.) of the computing device, such as sensor system 200 of FIG. 2. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 600 may be implemented as software components that are executed and run on one or more processors (e.g., processor 710 of FIG. 7, and/or other processor(s)). In some cases, the operations of the process 600 can be implemented by a system having the architecture of computing system 700 of FIG. 7.

At block 602, the computing device (or component thereof) may obtain a first line of data (e.g., first line 526 of FIG. 5) from a first sensor (e.g., sensor 202A of FIG. 2). In some cases, each line of data includes a set of data blocks (e.g., data blocks 318 of FIG. 3) and wherein the current intermediate hash includes an intermediate hash value and data from a data block of a previous line of data.

At block 604, the computing device (or component thereof) may retrieve, from the at least one memory, an intermediate hash (e.g., stored in multi-context lookup table 252 of FIG. 2, MAC lookup table 324 of FIG. 3, etc.) associated with the first sensor. In some cases, the at least one memory comprises at least one lookup table (e.g., multi-context lookup table 252 of FIG. 2, MAC lookup table 324 of FIG. 3, etc.). In some examples, the computing device (or component thereof) may associate a line of data with the first sensor based on virtual channel information in a header of the line of data; and store the current intermediate hash in the at least one lookup table based on the virtual channel information. For example, each line may include a packet header and packet footer along with the payload (e.g., sensor data), and the packet header for a line may include information about the sensor data such as the virtual channel, a data type of the sensor data, and/or a word count (e.g., length of the sensor data).

At block 606, the computing device (or component thereof) may determine a current intermediate hash (e.g., first intermediate hash 510 of FIG. 5, second intermediate hash 518 of FIG. 5, etc.) based on sensor data in the first line of data.

At block 608, the computing device (or component thereof) may store the current intermediate hash in the at least one memory for processing a second line of data (e.g., second line 528 of FIG. 5) associated with the first sensor. In some cases, a line of data from a second sensor (e.g., sensor 202N of FIG. 2) is processed before processing the second line of data. In some examples, the computing device (or component thereof) may store context data for a set of lines in the at least one lookup table based on the virtual channel information; and retrieve the stored context data and the current intermediate hash based on the virtual channel information. In some cases, the computing device (or component thereof) may obtain the second line of data from the first sensor, wherein the first line of data and second line of data are part of a set of lines; determine the second line of data includes a message authentication code (MAC) value (e.g., message authentication code (MAC) 212A of FIG. 2); determine a calculated MAC based on the stored current intermediate hash and a portion of the sensor data in the second line of data based on the determination that the second line of data includes the MAC value; and compare the calculated MAC to the MAC value (e.g., by comparator 330 of FIG. 3) to authenticate the set of lines.

In some cases, the devices or apparatuses configured to perform the operations of the process 600 and/or other processes described herein may include a processor, microprocessor, microcomputer, or other component of a device that is configured to carry out the steps of the process 600 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 600 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 600 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 600 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Figure 7:
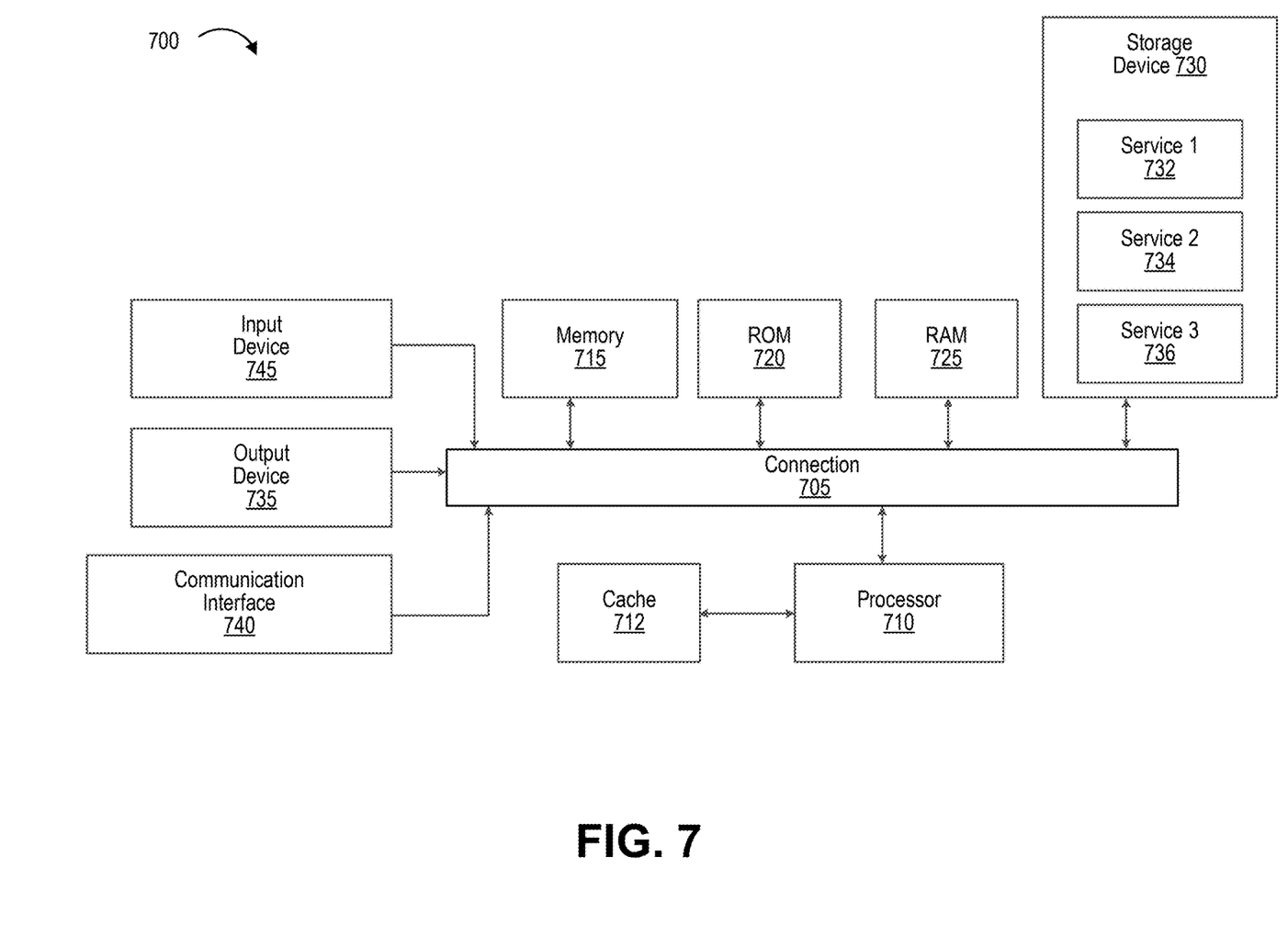
FIG. 7 is a diagram illustrating an example of a system for implementing certain aspects of the present technology.

FIG. 7 is a diagram illustrating an example of a system for implementing certain aspects of the present technology. In particular, FIG. 7 illustrates an example of computing system 700, which can be for example any computing device making up internal computing system, a remote computing system, a camera, or any component thereof in which the components of the system are in communication with each other using connection 705. Connection 705 can be a physical connection using a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example computing system 700 includes at least one processing unit (CPU or processor) 710 and connection 705 that couples various system components including system memory 715, such as read-only memory (ROM) 720 and random access memory (RAM) 725 to processor 710. Computing system 700 can include a cache 712 of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, camera, accelerometers, gyroscopes, etc. Computing system 700 can also include output device 735, which can be one or more of a number of output mechanisms. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.10 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 730 can include software services, servers, services, etc., that when the code that defines such software is executed by the processor 710, it causes the system to perform a function. In some examples, a hardware service that performs a particular function can include the software component stored in a computer-readable medium in connection with the necessary hardware components, such as processor 710, connection 705, output device 735, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the present disclosure include:

Aspect 1. An apparatus for authenticating sensor data, comprising: at least one memory; and at least one processor coupled to the at least one memory and configured to: obtain a first line of data from a first sensor; retrieve, from the at least one memory, an intermediate hash associated with the first sensor; determine a current intermediate hash based on sensor data in the first line of data; and store the current intermediate hash in the at least one memory for processing a second line of data associated with the first sensor.

Aspect 2. The apparatus of Aspect 1, wherein the at least one processor is further configured to: obtain the second line of data from the first sensor, wherein the first line of data and second line of data are part of a set of lines; determine the second line of data includes a message authentication code (MAC) value; determine a calculated MAC based on the stored current intermediate hash and a portion of the sensor data in the second line of data based on the determination that the second line of data includes the MAC value; and compare the calculated MAC to the MAC value to authenticate the set of lines.

Aspect 3. The apparatus of any of Aspects 1-2, wherein each line of data includes a set of data blocks and wherein the current intermediate hash includes an intermediate hash value and data from a data block of a previous line of data.

Aspect 4. The apparatus of any of Aspects 1-3, wherein a line of data from a second sensor is processed before processing the second line of data.

Aspect 5. The apparatus of any of Aspects 1-4, wherein the at least one memory comprises at least one lookup table.

Aspect 6. The apparatus of Aspect 5, wherein the at least one processor is further configured to: associate a line of data with the first sensor based on virtual channel information in a header of the line of data; and store the current intermediate hash in the at least one lookup table based on the virtual channel information.

Aspect 7. The apparatus of Aspect 6, wherein the at least one processor is further configured to: store context data for a set of lines in the at least one lookup table based on the virtual channel information; and retrieve the stored context data and the current intermediate hash based on the virtual channel information.

Aspect 8. A method for authenticating sensor data, comprising: obtaining a first line of data from a first sensor; retrieving, from at least one memory, an intermediate hash associated with the first sensor; determining a current intermediate hash based on sensor data in the first line of data; and storing the current intermediate hash in the at least one memory for processing a second line of data associated with the first sensor.

Aspect 9. The method of Aspect 8, further comprising: obtaining the second line of data from the first sensor, wherein the first line of data and second line of data are part of a set of lines; determining the second line of data includes a message authentication code (MAC) value; determining a calculated MAC based on the stored current intermediate hash and a portion of the sensor data in the second line of data based on the determination that the second line of data includes the MAC value; and comparing the calculated MAC to the MAC value to authenticate the set of lines.

Aspect 10. The method of any of Aspects 8-9, wherein each line of data includes a set of data blocks and wherein the current intermediate hash includes an intermediate hash value and data from a data block of a previous line of data.

Aspect 11. The method of any of Aspects 8-9, wherein a line of data from a second sensor is processed before processing the second line of data.

Aspect 12. The method of any of Aspects 8-9, wherein the at least one memory includes at least one lookup table.

Aspect 13. The method of Aspect 12, further comprising: associating a line of data with the first sensor based on virtual channel information in a header of the line of data; and storing the current intermediate hash in the at least one lookup table based on the virtual channel information.

Aspect 14. The method of Aspect 13, further comprising: storing context data for a set of lines in the at least one lookup table based on the virtual channel information; and retrieving the stored context data and the current intermediate hash based on the virtual channel information.

Aspect 15. A non-transitory computer-readable medium having stored thereon instructions that, when executed by at least one processor, cause the at least one processor to: obtain a first line of data from a first sensor; retrieve, from at least one memory, a partial message authentication code (MAC) associated with the first sensor; determine a current intermediate hash based on sensor data in the first line of data; and store the current intermediate hash in the at least one memory for processing a second line of data associated with the first sensor.

Aspect 16. The non-transitory computer-readable medium of Aspect 15, wherein the instructions cause the at least one processor to: obtain the second line of data from the first sensor, wherein the first line of data and second line of data are part of a set of lines; determine the second line of data includes a MAC value; determine a calculated MAC based on the stored current intermediate hash and a portion of the sensor data in the second line of data based on the determination that the second line of data includes the MAC value; and compare the calculated MAC to the MAC value to authenticate the set of lines.

Aspect 17. The non-transitory computer-readable medium of any of Aspects 15-16, wherein each line of data includes a set of data blocks and wherein the current intermediate hash includes an intermediate hash value and data from a data block of a previous line of data.

Aspect 18. The non-transitory computer-readable medium of any of Aspects 15-17, wherein a line of data from a second sensor is processed before processing the second line of data.

Aspect 19. The non-transitory computer-readable medium of any of Aspects 15-18, wherein the at least one memory includes at least one lookup table.

Aspect 20. The non-transitory computer-readable medium of Aspect 19, wherein the instructions cause the at least one processor to: associate a line of data with the first sensor based on virtual channel information in a header of the line of data; and store the current intermediate hash in the at least one lookup table based on the virtual channel information.

Aspect 21. The non-transitory computer-readable medium of Aspect 20, wherein the instructions cause the at least one processor to: store context data for a set of lines in the at least one lookup table based on the virtual channel information; and retrieve the stored context data and the current intermediate hash based on the virtual channel information.

Aspect 22: An apparatus for authenticating sensor data, comprising one or more means for performing operations according to any of Aspects 8 to 14.

What is claimed is:

1. An apparatus for authenticating sensor data, comprising:
at least one memory; and at least one processor coupled to the at least one memory and configured to:
obtain a first line of data and a second line of data from a first sensor, wherein the first line of data and the second line of data are part of a set of lines;
determine a current intermediate hash based on sensor data in the first line of data;
store the current intermediate hash in the at least one memory for processing the second line of data associated with the first sensor;
determine the second line of data includes a message authentication code (MAC) value;
determine a calculated MAC based on the stored current intermediate hash and a portion of sensor data in the second line of data based on the determination that the second line of data includes the MAC value; and
compare the calculated MAC to the MAC value to authenticate the set of lines.

2. The apparatus of claim 1, wherein the at least one processor is further configured to:
retrieve, from the at least one memory, an intermediate hash associated with the first sensor, wherein the current intermediate hash is determined based on the retrieved intermediate hash.

3. The apparatus of claim 1, wherein each line of data includes a set of data blocks and wherein the current intermediate hash includes an intermediate hash value and data from a data block of a previous line of data.

4. The apparatus of claim 1, wherein a line of data from a second sensor is processed before processing the second line of data.

5. The apparatus of claim 1, wherein the at least one memory comprises at least one lookup table.

6. The apparatus of claim 5, wherein the at least one processor is further configured to:
associate a line of data with the first sensor based on virtual channel information in a header of the line of data; and store the current intermediate hash in the at least one lookup table based on the virtual channel information.

7. The apparatus of claim 6, wherein the at least one processor is further configured to:
store context data for a set of lines in the at least one lookup table based on the virtual channel information; and retrieve the stored context data and the current intermediate hash based on the virtual channel information.

8. A method for authenticating sensor data, being implemented by at least one processor, comprising:
obtaining a first line of data and a second line of data from a first sensor, wherein the first line of data and the second line of data are part of a set of lines;
determining a current intermediate hash based on sensor data in the first line of data;
storing the current intermediate hash in at least one memory for processing the second line of data associated with the first sensor;
determining that the second line of data includes a message authentication code (MAC) value;
determining a calculated MAC based on the stored current intermediate hash and a portion of sensor data in the second line of data based on the determination that the second line of data includes the MAC value; and
comparing the calculated MAC to the MAC value to authenticate the set of lines.

9. The method of claim 8, further comprising:
retrieving, from the at least one memory, an intermediate hash associated with the first sensor, wherein the current intermediate hash is determined based on the retrieved intermediate hash.

10. The method of claim 8, wherein each line of data includes a set of data blocks and wherein the current intermediate hash includes an intermediate hash value and data from a data block of a previous line of data.

11. The method of claim 8, wherein a line of data from a second sensor is processed before processing the second line of data.

12. The method of claim 8, wherein the at least one memory includes at least one lookup table.

13. The method of claim 12, further comprising:
associating a line of data with the first sensor based on virtual channel information in a header of the line of data; and storing the current intermediate hash in the at least one lookup table based on the virtual channel information.

14. The method of claim 13, further comprising:
storing context data for a set of lines in the at least one lookup table based on the virtual channel information; and retrieving the stored context data and the current intermediate hash based on the virtual channel information.

15. A non-transitory computer-readable medium having stored thereon instructions that, when executed by at least one processor, cause the at least one processor to:
obtain a first line of data and a second line of data from a first sensor, wherein the first line of data and the second line of data are part of a set of lines;
determine a current intermediate hash based on sensor data in the first line of data;
store the current intermediate hash in at least one memory for processing the second line of data associated with the first sensor;
determine the second line of data includes a message authentication code (MAC) value;
determine a calculated MAC based on the stored current intermediate hash and a portion of sensor data in the second line of data based on the determination that the second line of data includes the MAC value; and
compare the calculated MAC to the MAC value to authenticate the set of lines.

16. The non-transitory computer-readable medium of claim 15, wherein the instructions cause the at least one processor to:
retrieve, from the at least one memory, an intermediate hash associated with the first sensor, wherein the current intermediate hash is determined based on the retrieved intermediate hash.

17. The non-transitory computer-readable medium of claim 15, wherein each line of data includes a set of data blocks and wherein the current intermediate hash includes an intermediate hash value and data from a data block of a previous line of data.

18. The non-transitory computer-readable medium of claim 15, wherein a line of data from a second sensor is processed before processing the second line of data.

19. The non-transitory computer-readable medium of claim 15, wherein the at least one memory includes at least one lookup table.

20. The non-transitory computer-readable medium of claim 19, wherein the instructions cause the at least one processor to: associate a line of data with the first sensor based on virtual channel information in a header of the line of data; and store the current intermediate hash in the at least one lookup table based on the virtual channel information.

* * * * *